United States Patent [19]

Komarnicki

[11] Patent Number: 5,000,253
[45] Date of Patent: Mar. 19, 1991

[54] VENTILATING HEAT RECOVERY SYSTEM

[76] Inventor: Roy Komarnicki, P.O. Box 433, Station "L", Winnipeg, Manitoba, Canada, R3H 0Z6

[21] Appl. No.: 451,570

[22] Filed: Dec. 18, 1989

Related U.S. Application Data

[63] Continuation-in-part of Ser. No. 329,892, Mar. 28, 1989, abandoned.

[30] Foreign Application Priority Data

Mar. 31, 1988 [CA] Canada ................................. 563200

[51] Int. Cl.⁵ ........................... F28F 3/08; F28D 9/02
[52] U.S. Cl. ..................................... 165/54; 165/164; 165/165; 165/166; 165/903
[58] Field of Search ................. 165/54, 166, 165, 164, 165/909; 98/33.1

[56] References Cited

U.S. PATENT DOCUMENTS

| 691,786 | 1/1902 | Levey . |
| 749,325 | 1/1904 | Roderwald . |
| 1,799,081 | 3/1931 | Blomqvist . |
| 1,815,938 | 7/1931 | Trogner . |
| 2,418,191 | 4/1947 | Parrish . |
| 2,687,876 | 8/1954 | Hytte . |
| 2,806,676 | 9/1957 | Frenkel . |
| 2,812,165 | 11/1957 | Hammond . |
| 3,313,343 | 4/1967 | Ware et al. . |
| 3,430,694 | 3/1969 | Cardell . |
| 3,528,496 | 9/1970 | Kun . |
| 3,570,593 | 3/1971 | Isaaz et al. . |
| 3,731,736 | 5/1973 | Fernandes . |
| 3,734,177 | 5/1973 | Bellovary et al. . |
| 3,907,028 | 9/1975 | Lawson . |
| 3,983,935 | 10/1976 | Henrion . |
| 4,149,591 | 4/1979 | Albertsen . |
| 4,171,722 | 10/1979 | Huggins ................................. 165/909 |
| 4,206,746 | 6/1980 | Chubb . |
| 4,228,849 | 10/1980 | Heinola . |
| 4,232,821 | 11/1980 | Backlund . |
| 4,249,597 | 2/1981 | Carey . |
| 4,282,927 | 8/1981 | Simmons . |
| 4,298,059 | 11/1981 | Krauth et al. . |
| 4,306,618 | 12/1981 | Honkajarvi . |
| 4,354,551 | 10/1982 | Kristofferson et al. . |
| 4,377,201 | 3/1983 | Kruse et al. ............................. 165/54 |
| 4,402,361 | 9/1983 | Dominguez . |
| 4,451,960 | 6/1984 | Molitor . |
| 4,577,683 | 3/1986 | Kelch . |
| 4,579,163 | 4/1986 | Maendel ................................ 165/54 |
| 4,588,659 | 5/1986 | Abens et al. . |
| 4,624,305 | 11/1986 | Rojey . |
| 4,646,822 | 3/1987 | Voggenreiter et al. . |
| 4,653,575 | 3/1987 | Courchesne . |
| 4,653,581 | 3/1987 | Yogo et al. . |
| 4,676,305 | 6/1987 | Doty . |
| 4,729,428 | 3/1988 | Yasutake et al. . |

FOREIGN PATENT DOCUMENTS

| 0074298 | 3/1983 | European Pat. Off. . |
| 0074740 | 3/1983 | European Pat. Off. ............ 165/166 |
| 0108377 | 5/1984 | European Pat. Off. . |
| 3426778 | 5/1985 | Fed. Rep. of Germany ........ 165/54 |
| 3445469 | 7/1985 | Fed. Rep. of Germany . |
| 2490329 | 3/1982 | France ................................... 165/47 |
| 2533021 | 3/1984 | France . |
| 217042 | 9/1941 | Switzerland . |
| WO8503767 | 8/1985 | World Int. Prop. O. .......... 165/166 |

Primary Examiner—John Ford
Attorney, Agent, or Firm—Murray E. Thrift; Stanley G. Ade; Adrian D. Battison

[57] ABSTRACT

A ventilating heat recovery system is used for exchanging heat between fresh air introduced to a building and stale air exhausted from the building. The system is designed to provide a long, counterflow heat exchange path. The system includes a stack of rectangular plates coupled to arcuate duct sections to provide to interleaved sinuous air paths in heat exchange relation with one another.

11 Claims, 5 Drawing Sheets

# VENTILATING HEAT RECOVERY SYSTEM

CROSS REFERENCE TO RELATED APPLICATIONS

This application is a continuation in part of application Ser. No. 329,892, filed Mar. 28, 1989 now abandoned.

FIELD OF THE INVENTION

The present invention relates to ventilating heat recovery systems and more particularly to ventilating systems constructed to exchange heat between stale air being exhausted from a building and fresh air being blown into the building, either to warm or cool the incoming fresh air.

BACKGROUND

With the increasing costs of building heating and cooling, it has become more and more common to make buildings as air tight as possible. This brings with it the significant problem of lack of ventilation and the consequent build-up of stale air in a building. One solution to this later problem is the use of a ventilating system drawing fresh air in from the outside of the building and exhausting stale air to the outside while transferring the heat content of the warm air to the cold air. This saves heat in cold conditions and reduces incoming heat in hot ambient conditions.

The present invention is concerned with a novel form of ventilating heat recovery system for this purpose.

SUMMARY

According to the present invention there is provided a ventilating heat recovery system comprising:

a plurality of substantially rectangular, flat plates spaced one above the other in a vertical stack, the plates defining therebetween alternating first and second flat duct sections;

first arcuate duct sections extending along opposite first and second sides of the stack and joining the first flat duct sections in the sequence;

second arcuate duct sections extending along opposite third and fourth sides of the stack and joining the second flat duct sections in sequence; and end plates joining the edges of adjacent ends of the flat, stacked plates between the arcuate duct sections.

The ventilating heat recovery system of the present invention is compact and can be easily installed. It is operated in a combined counter-flow and cross flow mode to ensure the most efficient heat transfer consistent with minimal condensation problems. Therefore the unit may be installed outside as well as inside the building.

BRIEF DESCRIPTION OF THE DRAWINGS

In the accompanying drawings, which illustrate exemplary embodiments of the present invention.

DETAILED DESCRIPTION

Figure 1:
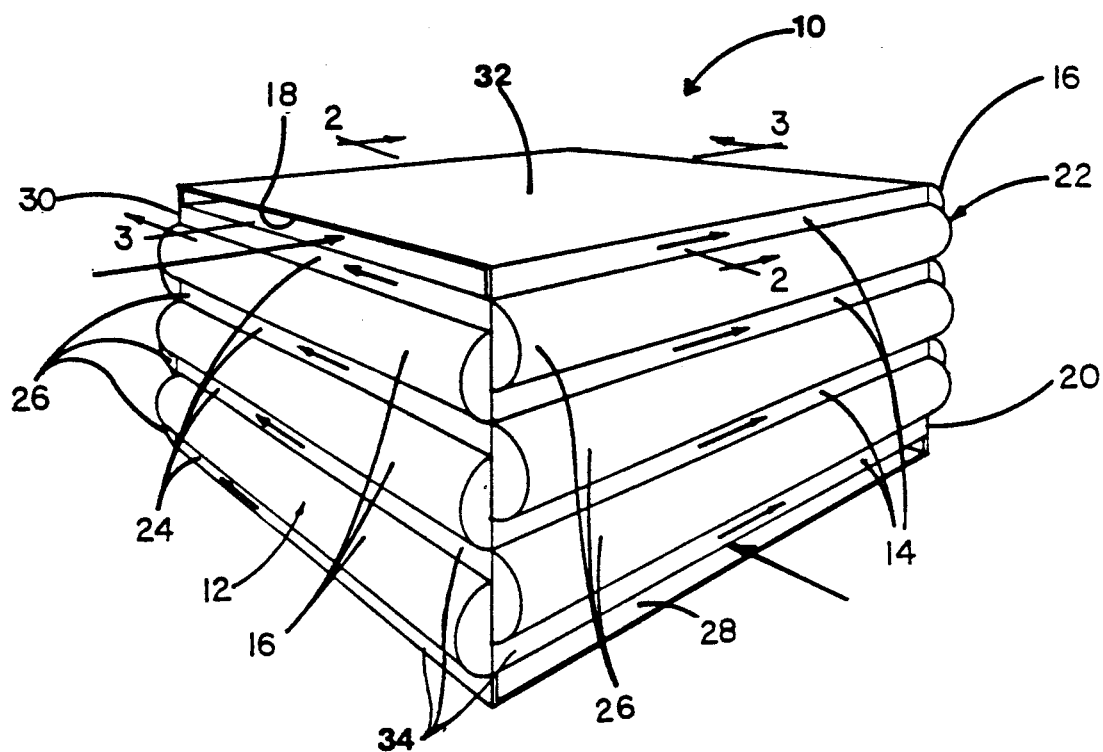
FIG. 1 is a perspective view of a flat, square multi-pass heat exchanger for use in a ventilating heat recovery system.

Referring to the accompanying drawings, FIG. 1 illustrates a compact, square heat exchanger 10 with a sinous stale air duct 12 with plural flat, square sections 14 spaced one above the other and connected in sequence by arcuate duct sections 16. The stale air inlet 18 is an open end of the duct 12 at the top of the recovery system, while the stale air outlet 20 is an open end of the duct at the bottom, and on the opposite side. The fresh air duct 22 is arranged perpendicular to the stale air duct and consists of flat sections 24 interposed between the flat sections 14 of the fresh air duct 12. The flat sections 24 are connected in sequence by arcuate duct sections 26. The fresh air inlet 28 is located at the bottom, along one side perpendicular to the stale air inlet 18 and outlet 20, and the outlet 30 for fresh air is along the opposite side at the top.

The heat exchanger is constructed of a stack of square plates 32, the arcuate duct sections or returns 16 and 26 and end plates 34 forming the sides of the flat sections of the two ducts.

Figure 2:
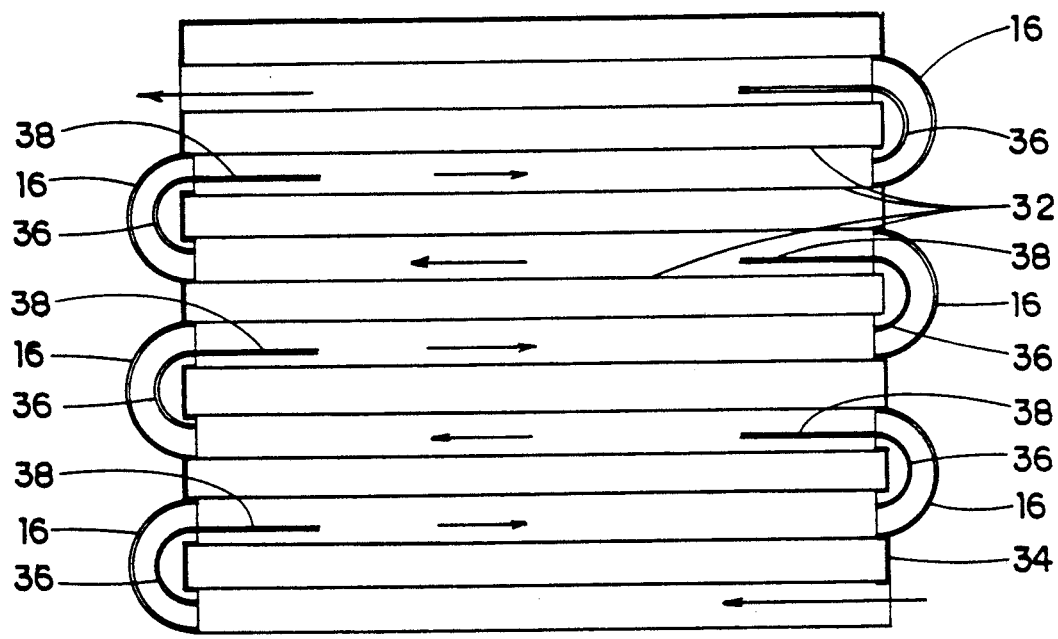
FIG. 2 is a cross-section along line 2—2 of FIG. 1.
Figure 3:
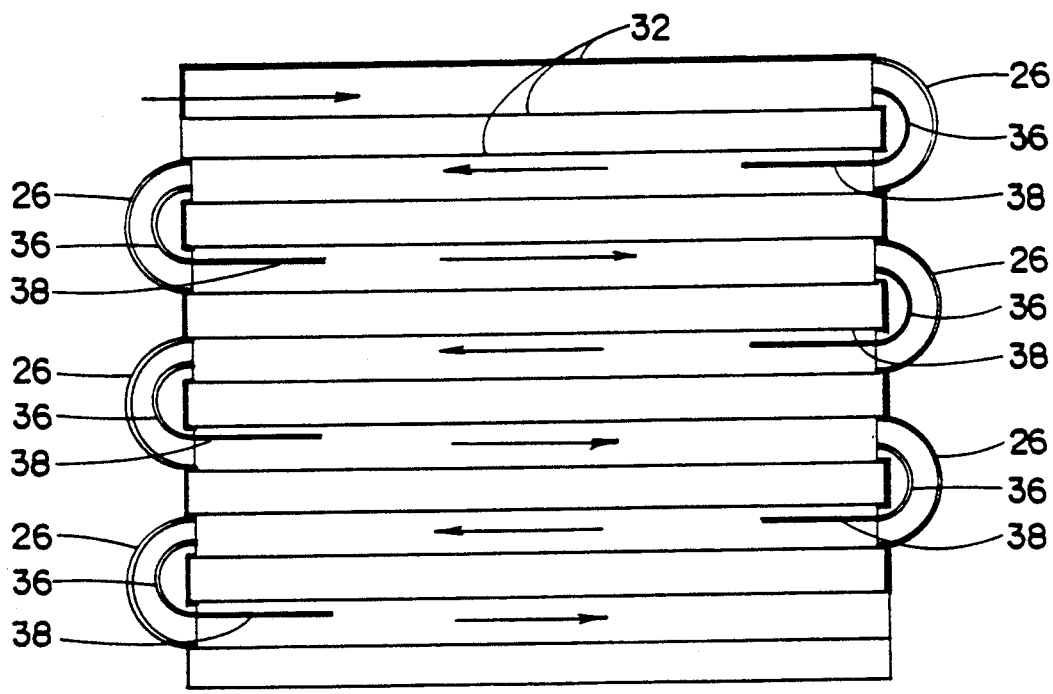
FIG. 3 is a cross-section along line 3—3 of FIG. 1.
Figure 4:
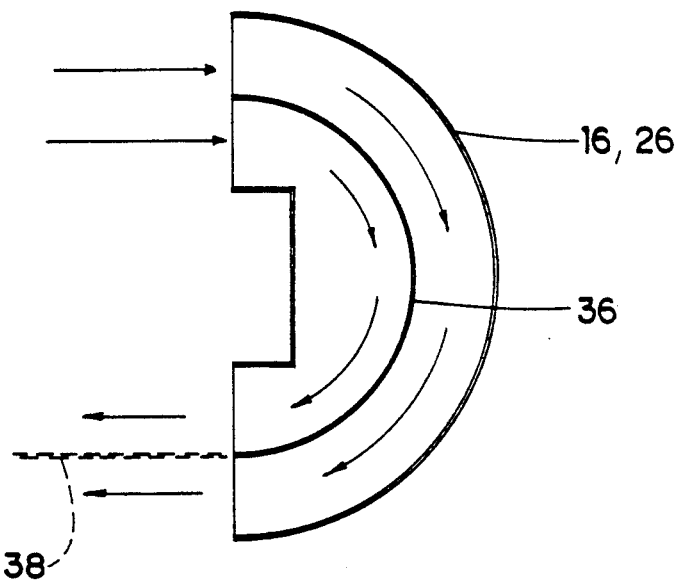
FIG. 4 is a cross-section of a duct return.

As illustrated in FIGS. 2, 3 and 4, the arcuate duct sections 16 and 26 fit into the ends of the associated flat duct sections. They are removable to allow cleaning of the inside of the heat exchanger.

The arcuate duct sections are not circular in profile but are flattened so that the flow cross-section remains relatively constant throughout the length of the duct section. At the centre of the section, the flow cross-section at B (FIG. 4) is no more than ten percent greater than the flow cross-section at A, the inlet and outlet.

Each of the arcuate duct sections is also equipped with a flow divider 36. This is a curved plate extending from the inlet to the outlet to define two separate flow zones in the arcuate duct section. The function of this device is to prevent the air flow from concentrating at the outside curved wall due to the effects of inertia as the air flows around the flow reversing return. At the outlet of the arcuate section, the flow divider lines up with a flow straightening vane 38 extending part way along the following flat duct section. This flow straightener confines the air flowing on the inner side of the flow divider to flow along the adjacent plate 32. In the absence of this confining straightener, a low pressure zone would tend to form along the inlet edge of the plate, limiting heat transfer through the plate and thus reducing the efficiency of the heat exchange as a whole.

Figure 5:
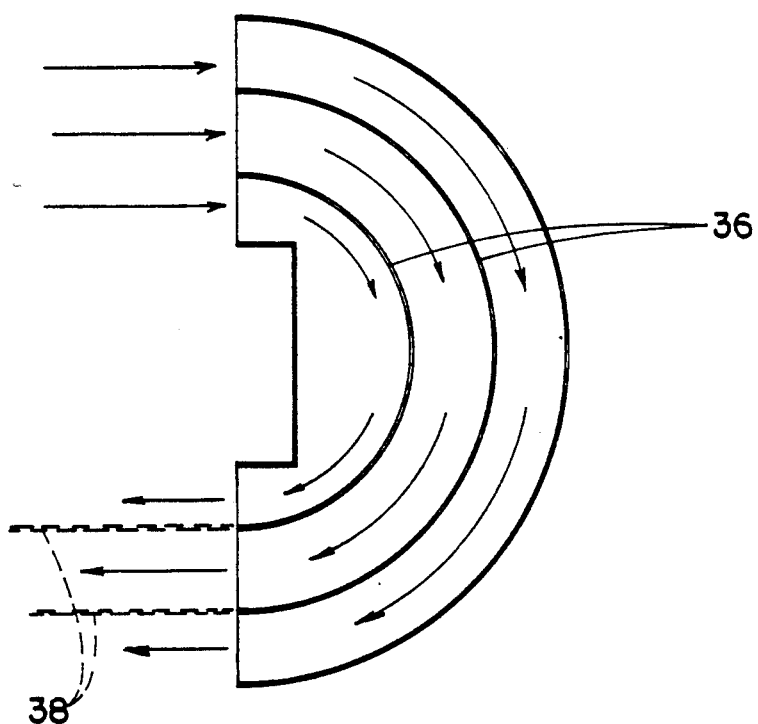
FIG. 5 is a cross-section of another embodiment of duct return.

With larger sized heat exchangers, two or more flow dividers may be used in the arcuate duct sections as illustrated in FIG. 5. Additional flow straighteners could then be used in the flat duct sections to limit the flow disturbing effects of the flow reversal.

Figure 6:
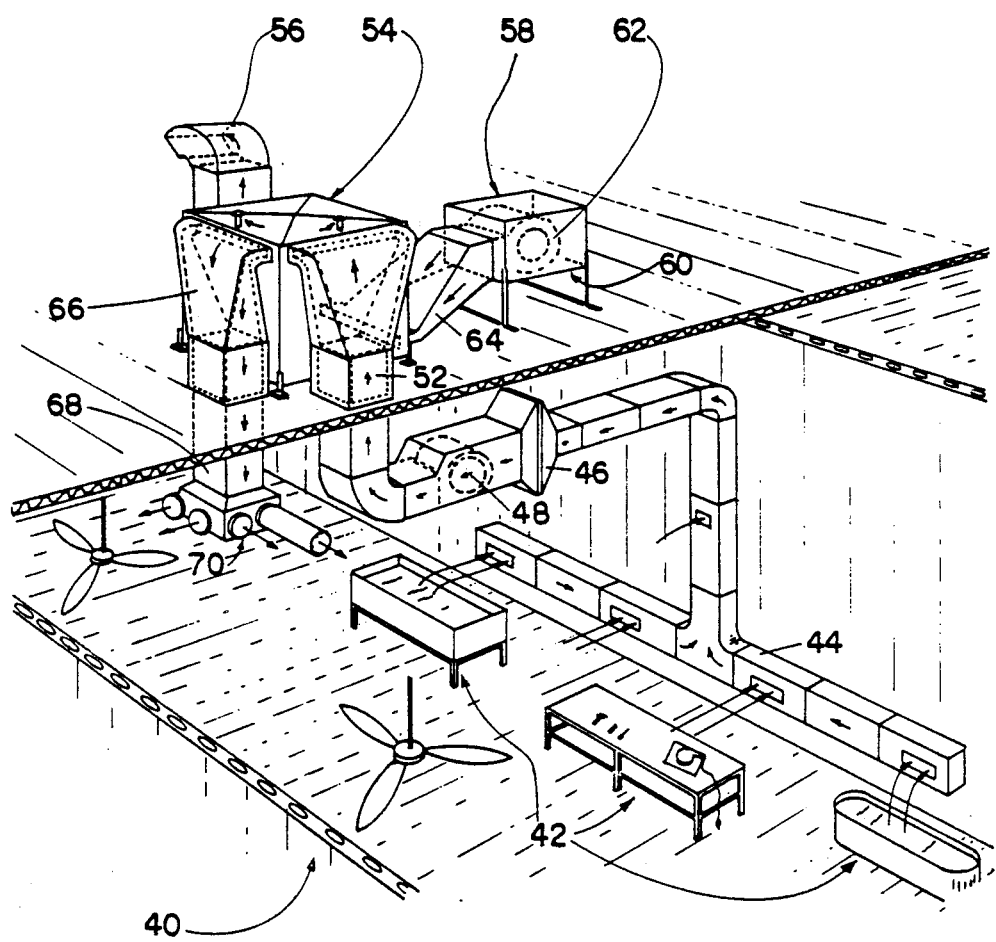
FIG. 6 is a pictorial representation of a ventilating heat recovery system.

FIG. 6 illustrates a ventilating heat recovery system for a building incorporating a heat exchanger as described in the foregoing. The building 40 illustrated is an industrial building containing processing or shop equipment 42. A duct 44 is provided for collecting fumes and stale air from the shop area. This air is drawn through a filter box 46 by a fan 48. The fan delivers the stale air to a stale air outlet duct that passes through the roof of the building into an insulated duct section 52 discharging in turn into a heat exchanger contained within a housing 54 on the roof of the building. A stale air exhaust 56 leads from the opposite side of the housing for discharge to ambient air.

Beside the housing 54 is a fresh air inlet 58. This includes a filter 60 through which fresh air is drawn by a fan 62 and a fresh air supply duct 64 through which the fresh air is fed into the housing 54. An insulated fresh air inlet 66 from the housing through the roof of the building leads to an internal fresh air inlet duct 68 terminating in a fresh air distributor 70.

Figure 7:
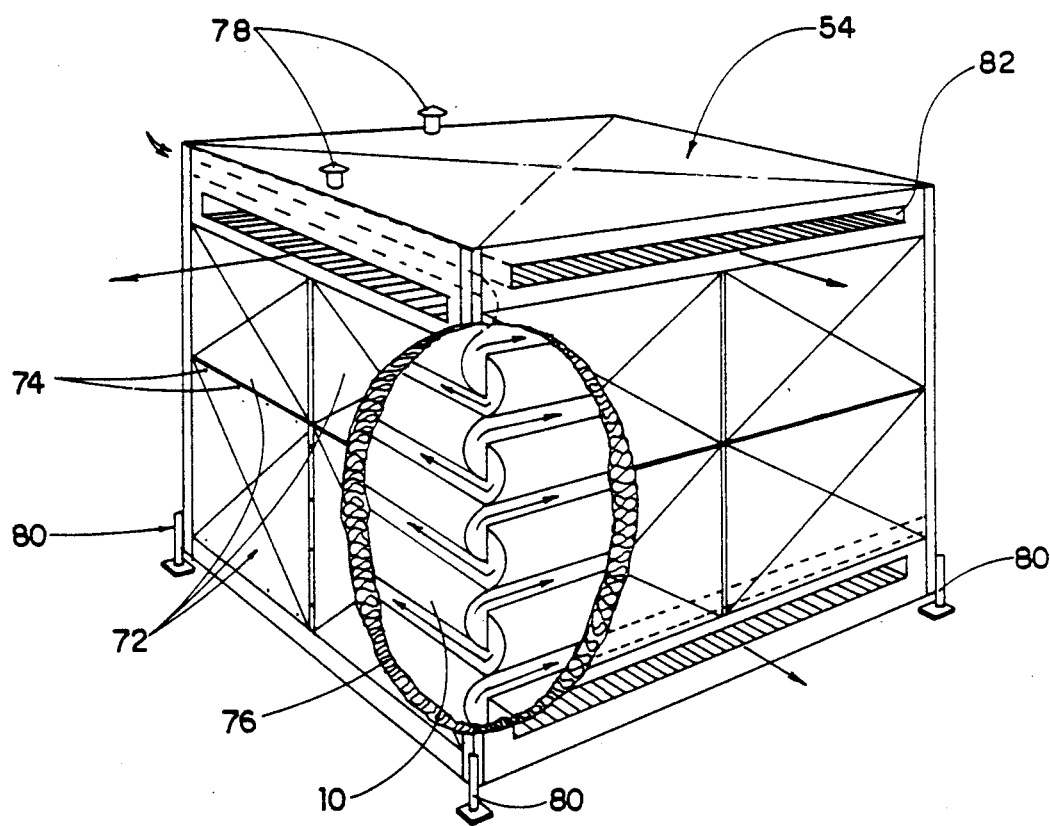
FIG. 7 is a perspective view of a heat exchange unit of the system of FIG. 6.

The construction of the housing is illustrated most particularly in FIG. 7. The housing is enclosed by a series of panels 72 that are secured in place with screws 74 so that they can readily be removed for servicing purposes. The panels are of a sandwich construction with internal insulation 76. The heat exchanger 10 is enclosed by the housing, with the space around the heat exchanger ventilated. Also, vents 78 through the roof connect to the heat exchanger ducts near the top. These serve to exhaust fumes that may collect at the top of the unit when the fans are stopped. The housing 54 is supported on four adjustable legs 80.

FIG. 7 also illustrates a bypass 82 which is a flat, rectangular duct on top of the heat exchanger. The bypass receives stale air from the stale air outlet duct 52 and bypasses that air through the housing 54 to the next heat exchanger unit in a case where more than one unit is employed. The units then operate in parallel. Where a single unit is in use, the bypass 82 is blanked off.

In use of the unit for heat recovery purposes, the warm, stale air is ejected under pressure into the top of the heat exchanger, while cold, fresh air is injected into the bottom. As the warm air is cooled, it descends through the heat exchanger, while the warming fresh air rises.

Both sides of the heat exchanger are fed under pressure by the fans rather than having the fans draw air through the exchanger. This limits the effect of any leakage in the unit by minimizing any cross leakage and produces an over pressure inside the unit so that infiltration is eliminated. This also ensures that there is constant air contact with the plates between the ducts.

By injecting the fresh air at the bottom, to exhaust at the top and injecting the warm, stale air at the top to exhaust at the bottom, a combined counter and cross flow effect is produce which provides a gradual temperature change of the two air flows to minimize condensation and resultant corrosion.

While specific embodiments of the invention have been described in the foregoing, it is to be understood that the invention is not limited to those embodiments alone. The scope of the present invention is to be ascertained by reference to the accompanying claims.

I claim:

1. A ventilating heat recovery system including an air-to-air heat exchanger comprising:
    a plurality of substantially rectangular, flat plates spaced one above the other in a vertical stack, the plates defining therebetween alternating first and second flat duct sections;
    first arcuate duct sections extending along opposite first and second sides of the stack and joining the first flat duct sections in sequence to provide a first duct for carrying stale air, each first arcuate duct section extending along the full length of the associated side of the stack;
    second arcuate duct sections extending along opposite third and fourth sides of the stack and joining the second flat duct sections in sequence to provide a second duct in heat exchange relationship with the first duct for carrying fresh air, each second arcuate duct extending along the full length of the associated side of the stack;
    each of the first flat duct sections having an open cross section, substantially unobstructed in the direction between the first and second sides of the stack;
    each of the second flat duct sections having an open cross section, substantially unobstructed between the third and fourth sides of the stack;
    a flow-directing curved wall within each arcuate duct section;
    flow straighteners in each flat duct section aligned with an end of the flow-directing curved wall in an adjacent arcuate duct section and extending partially along and in spaced substantially parallel relationship to the associated flat duct section; and
    end plates joining the edges of adjacent ends of the flat, stacked plates between the arcuate duct sections.

2. A system according to claim 1 wherein the first and second arcuate duct sections are individually removably attached to the plates.

3. A system according to claim 2 wherein each arcuate duct section has a flow cross-section that varies no more than 10% along the duct section.

4. A system according to claim 3 including plural flow directing curved walls within each arcuate duct section.

5. A system according to claim 4 including plural flow straighteners in each flat duct section, each aligned with an end of a respective flow directing curved wall in an adjacent arcuate duct section and extending partially along the associated flat duct section.

6. A system according to claim 1 housed within an insulated enclosure.

7. A system according to claim 1 including stale air supply means for supplying stale air from below the heat exchanger to a top end of the first duct.

8. A system according to claim 7 including stale air exhaust means for exhausting stale air from a bottom end of the first duct.

9. A system according to claim 8 including fresh air supply means for supplying fresh air to a bottom end of the second duct.

10. A system according to claim 9 including fresh air outlet means for discharging fresh air from a top end of the second duct below the heat exchanger.

11. A system according to claim 10 including bypass means coupled to the stale air supply means for passing stale air to a second recovery system of substantially the same configuration.

* * * * *